(12) United States Patent
Lin

(10) Patent No.: US 8,405,776 B2
(45) Date of Patent: Mar. 26, 2013

(54) STATE DETECTOR OF VIDEO DEVICE AND STATE DETECTION METHOD THEREOF

(75) Inventor: Hsin-I Lin, Yilan County (TW)

(73) Assignee: Novatek Microelectronics Corp., Hsinchu (TW)

( * ) Notice: Subject to any disclaimer, the term of this patent is extended or adjusted under 35 U.S.C. 154(b) by 922 days.

(21) Appl. No.: 12/326,904

(22) Filed: Dec. 3, 2008

(65) Prior Publication Data

US 2010/0053445 A1   Mar. 4, 2010

(30) Foreign Application Priority Data

Sep. 3, 2008   (TW) ............................... 97133804 A

(51) Int. Cl.
*H04N 5/46* (2006.01)

(52) U.S. Cl. ........ 348/555; 348/554; 348/557; 348/607; 348/505; 348/663

(58) Field of Classification Search ............... 348/555, 348/554, 557, 505, 506, 607, 663, 558; 382/167, 382/162, 275
See application file for complete search history.

(56) References Cited

U.S. PATENT DOCUMENTS

| | | | | |
|---|---|---|---|---|
| 6,833,875 B1 * | 12/2004 | Yang et al. | ................... | 348/665 |
| 7,599,006 B2 * | 10/2009 | Tashiro | ................... | 348/572 |
| 7,697,064 B2 * | 4/2010 | Komatsu | ................... | 348/453 |
| 2008/0259212 A1 * | 10/2008 | Fukumori | ................... | 348/505 |

\* cited by examiner

*Primary Examiner* — Jefferey Harold
*Assistant Examiner* — Jean W Desir
(74) *Attorney, Agent, or Firm* — Jianq Chyun IP Office

(57) ABSTRACT

A state detector of a video device and a state detection method thereof are provided. The state detector includes a first chroma detector, a second chroma detector, and a controller. The first chroma detector and the second chroma detector operate in a first state among a plurality of states. When the second chroma detector is not capable of processing an input signal normally, the controller controls the second chroma detector to switch between the states until the second chroma detector operates in a second state to process the input signal normally, and the first chroma detector is set to operating in the second state. As a result, the quality of a displayed image is improved.

11 Claims, 4 Drawing Sheets

STATE DETECTOR OF VIDEO DEVICE AND STATE DETECTION METHOD THEREOF

CROSS-REFERENCE TO RELATED APPLICATION

This application claims the priority benefit of Taiwan application serial no. 97133804, filed on Sep. 3, 2008. The entirety of the above-mentioned patent application is hereby incorporated by reference herein and made a part of specification.

BACKGROUND OF THE INVENTION

1. Field of the Invention

The present invention generally relates to a video device, and more particularly, to a state detection technique for a video device.

2. Description of Related Art

It is well known in the video device industry that the phase of a video signal has to be locked before the video signal is processed in order to process the video signal correctly.

A video signal further carries a color burst signal for denoting the phase of color information carried by the video signal. A chroma detector is used for detecting the color burst signal so that the phase of the color information can be locked and the correct color information can be decoded subsequently.

However, usually only one chroma detector is disposed in a video device. The chroma detector is used for processing an input signal and accordingly generating an output signal, and the chroma detector is also used for detecting whether the phase of the input signal can be locked. The chroma detector may not be able to lock the phase of the input signal when the signal source is changed, for example, when the input signal is changed from the National Television System Committee (NTSC) format to the Phase Alternating Line (PAL) format.

Accordingly, when the chroma detector cannot lock the phase of the input signal, a controller of the video device switches the operation state of the chroma detector according to a finite state machine (FSM) until the chroma detector can lock the phase of the input signal.

Generally, it takes a very long time for the controller to switch the operation state of the chroma detector according to the FSM. Besides, if the chroma detector cannot process the input signal normally and accordingly, a transient problem may be caused in a displayed image because the controller needs to continuously switch the operation state of the chroma detector.

Moreover, it is not necessary to change the operation state of the chroma detector when the strength of the input signal is reduced. However, in the conventional technique, the controller may mistakenly determine that the chroma detector cannot lock the phase of the input signal normally and accordingly switch the operation state of the chroma detector to re-lock the phase of the input signal. As a result, the quality of a displayed image may be affected.

SUMMARY OF THE INVENTION

Accordingly, the present invention is directed to a state detector of a video device, wherein the transient problem in a displayed image is improved.

The present invention is directed to a state detection method for a video device, wherein the quality of a displayed image is improved.

The present invention is directed to a state detection method for a video device, wherein the interference of a chroma detector to a displayed image when the chroma detector switches its operation mode is reduced.

The present invention provides a state detector of a video device, wherein the state detector includes a first chroma detector, a second chroma detector, and a controller. The first chroma detector operates in a first state among a plurality of states to process an input signal and accordingly generate an output signal. The second chroma detector operates in the first state among foregoing states to detect whether the input signal can be processed normally. The controller is coupled to the first chroma detector and the second chroma detector. When the second chroma detector is not capable of processing the input signal normally, the controller controls the second chroma detector to switch between foregoing states until the second chroma detector operates in a second state to process the input signal normally, and the first chroma detector is set to operating in the second state.

According to an embodiment of the present invention, the first chroma detector includes a sampler, a band-pass filter, a multiplier, a chroma demodulator, a low-pass filter, an auto gain controller (AGC), and a filter. The sampler samples the input signal according to a first parameter. The band-pass filter is coupled to the sampler for performing a band-pass filtering process to the input signal. The multiplier is coupled to the band-pass filter for performing a multiplication to the input signal according to a gain. The chroma demodulator is coupled to the multiplier for performing a chroma demodulation process to the input signal. The low-pass filter is coupled to the chroma demodulator for performing a low-pass filtering process to the input signal. The AGC is coupled to the low-pass filter for generating the gain according to the input signal. The filter is coupled to the low-pass filter and the sampler for filtering the input signal according to a second parameter and generating the first parameter.

According to an embodiment of the present invention, the second chroma detector has the same components as the first chroma detector. According to another embodiment of the present invention, the second chroma detector further includes a phase detector, wherein the phase detector is coupled to the low-pass filter for detecting whether the phase of the input signal can be locked.

According to an embodiment of the present invention, the state detector further includes a clamp and gain control circuit. The clamp and gain control circuit is coupled to the first chroma detector and the second chroma detector for adjusting the offset and gain of the input signal and outputting the adjusted input signal to the first chroma detector and the second chroma detector.

According to an embodiment of the present invention, the state detector further includes a horizontal sync detector. The horizontal sync detector is coupled to the controller, and an operation state of the horizontal sync detector is determined according to a control signal output by the controller. The horizontal sync detector horizontally synchronizes the input signal and detects whether the input signal is horizontally synchronized. According to another embodiment of the present invention, the state detector further includes a vertical sync detector. The vertical sync detector is coupled to the controller, and an operation state of the vertical sync detector is determined according to a control signal output by the controller. The vertical sync detector vertically synchronizes the input signal and detects whether the input signal is vertically synchronized.

According to an embodiment of the present invention, the state detector further includes a Y/C separator, wherein the Y/C separator is coupled to the first chroma detector for performing a Y/C separation process to the output signal.

According to another embodiment of the present invention, the state detector further includes an output device, wherein the output device is coupled to the first chroma detector for outputting the output signal.

The present invention provides a state detection method for a video device, wherein the video device includes a first chroma detector and a second chroma detector. The state detection method includes following steps. The first chroma detector is set to operating in a first state among a plurality of states to process an input signal and accordingly generate an output signal. In addition, whether the second chroma detector can process the input signal normally when it operates in the first state is detected. When the second chroma detector cannot process the input signal normally, the second chroma detector is controlled to switch between foregoing states until the second chroma detector operates in a second state to process the input signal normally, and the first chroma detector is set to operating in the second state.

The present invention provides a state detection method for a video device, wherein the video device includes a first chroma detector and a second chroma detector, and the first chroma detector operates in a first state to process an input signal and accordingly generate an output signal. The state detection method includes following steps. Whether the second chroma detector processes the input signal normally when the second chroma detector operates in the first state as the first chroma detector is detected. When the second chroma detector is not capable of processing the input signal normally, the first chroma detector remains to operation in the first state and the second chroma detector is controlled to switch between a plurality of states until the second chroma detector operates in a second state to process the input signal normally. The first chroma detector is switched from the first state to the second state to process the input signal.

In the present invention, a first chroma detector and a second chroma detector operate in a first state among a plurality of states. When it is detected that the second chroma detector is not capable of processing an input signal normally, the second chroma detector is controlled to switch among foregoing states until the second chroma detector can operate in a second state to process the input signal normally, and the first chroma detector is set to operating in the second state as well. Thereby, a transient problem in a displayed image is resolved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
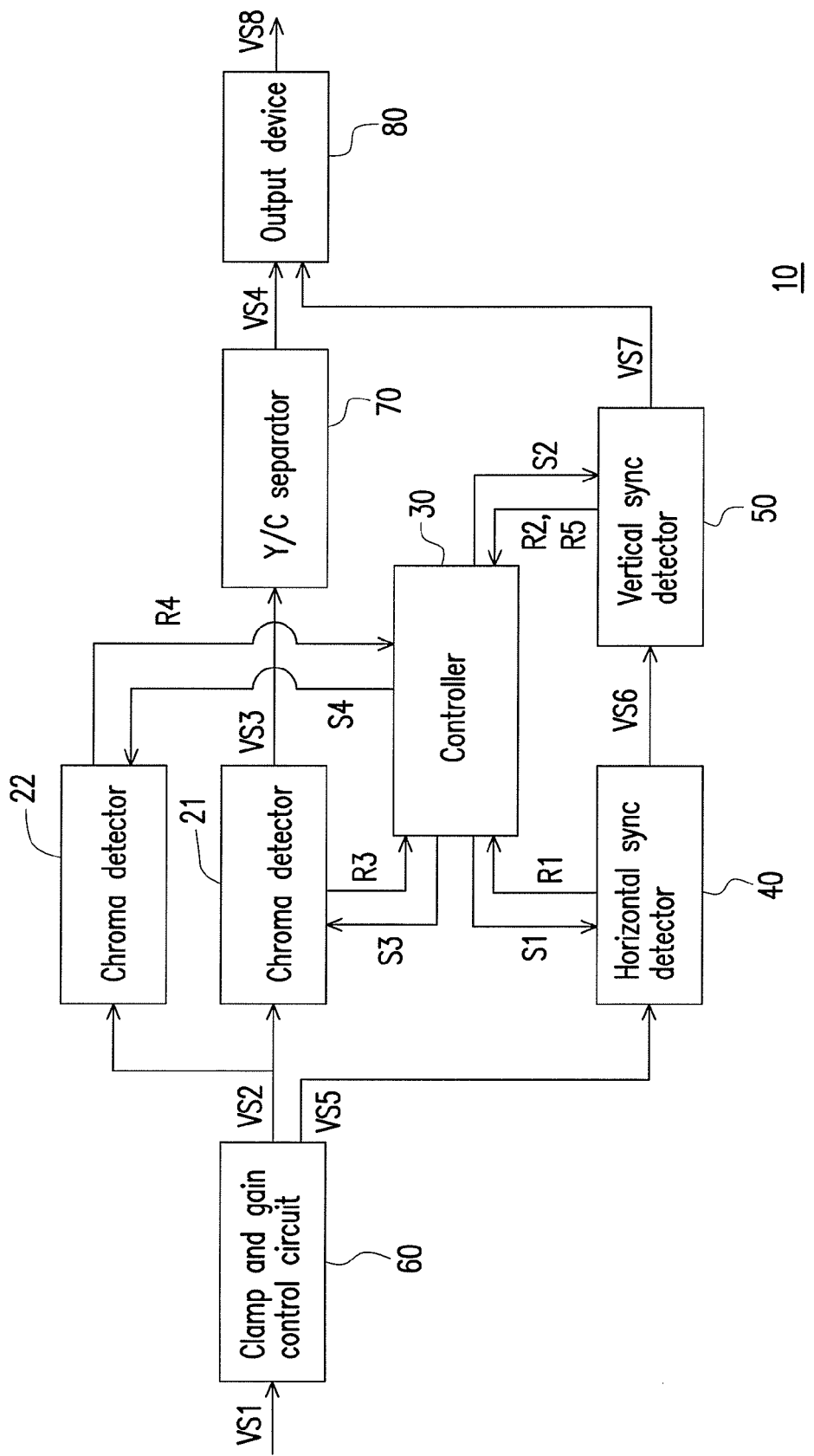
FIG. 1 is a block diagram of a state detector of a video device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Conventionally, a single chroma detector is disposed in a video device. Thus, when a controller constantly changes the operation state of the chroma detector according to a finite state machine (FSM), the chroma detector cannot process an input signal normally such that a transient problem is caused in a displayed image. Accordingly, in embodiments of the present invention, a first chroma detector and a second chroma detector are adopted for resolving foregoing problem.

In short, according to the present invention, the first chroma detector and the second chroma detector are set in the same operation state. The first chroma detector processes an input signal constantly, and the second chroma detector detects whether the input signal can be processed normally in the current state. When the second chroma detector cannot process the input signal normally, the second chroma detector is controlled to switch between a plurality of states so that eventually the second chroma detector can operate in a certain operation state to process the input signal normally, and the first chroma detector is then set to operating in that certain operation state.

Herein it should be noted that the first chroma detector can still process the input signal constantly in the original state when the second chroma detector switches its operation states. Thus, the transient problem in a displayed image can be resolved. This will be described in more details below with reference to accompanying drawings.

FIG. 1 is a block diagram of a state detector of a video device according to an embodiment of the present invention. Referring to FIG. 1, in the present embodiment, the state detector 10 includes a chroma detector 21, a chroma detector 22, a controller 30, a horizontal sync detector 40, a vertical sync detector 50, a clamp and gain control circuit 60, a Y/C separator 70, and an output device 80. The clamp and gain control circuit 60 is coupled to the chroma detector 21, the chroma detector 22, the horizontal sync detector 40, and the vertical sync detector 50. The controller 30 is coupled to the chroma detector 21, the chroma detector 22, the horizontal sync detector 40, and the vertical sync detector 50. The Y/C separator 70 is coupled to the chroma detector 21 and the output device 80. The vertical sync detector 50 is coupled to the horizontal sync detector 40 and the output device 80. Foregoing components will be described in detail below.

The clamp and gain control circuit 60 adjusts an offset and a gain of an input signal VS1 to maintain the signal at a fixed level and the amplitude thereof within a fixed range and generate signals VS2 and VS5. In the present embodiment, the input signal VS1 is a video signal. Foregoing disposition makes it convenient for a back-end circuit to process signals. In addition, the clamp and gain control circuit 60 provides the signal VS2 to the chroma detectors 21 and 22 and the signal VS5 to the horizontal sync detector 40.

The chroma detector 21 processes the signal VS2 and provides a signal VS3 to the Y/C separator 70. In addition, the chroma detector 21 also detects whether the phase of the signal VS2 can be correctly locked and accordingly generates a signal R3 for the controller 30. It is determined that the chroma detector 21 can lock the phase of the signal VS2 when the signal R3 is at logic high level. Contrarily, it is determined that the chroma detector 21 cannot lock the phase of the signal VS2 when the signal R3 is at logic low level.

Similarly, the chroma detector 22 detects whether the phase of the signal VS2 can be locked and provides a signal R4 to the controller 30. It is determined that the chroma detector 22 can lock the phase of the signal VS2 when the signal R4 is at logic high level. Contrarily, it is determined that the chroma detector 22 cannot lock the phase of the signal VS2 when the signal R4 is at logic low level.

The horizontal sync detector 40 horizontally synchronizes the signal VS5 and provides a signal VS6 to the vertical sync detector 50. In addition, the horizontal sync detector 40 also detects whether the signal VS6 is horizontally synchronized and provides a signal R1 to the controller 30. It is determined that the signal VS6 is horizontally synchronized when the signal R1 is at logic high level. Contrarily, it is determined that the signal VS6 is not horizontally synchronized when the signal R1 is at logic low level.

The vertical sync detector 50 vertically synchronizes the signal VS6 and provides a signal VS7 to the output device 80. In addition, the vertical sync detector 50 also detects whether the signal VS7 is vertically synchronized and provides a signal R2 to the controller 30. It is determined that the signal VS7 is vertically synchronized when the signal R2 is at logic high level. Contrarily, it is determined that the signal VS7 is not vertically synchronized when the signal R2 is at logic low level. Moreover, the vertical sync detector 50 further detects the number of vertical lines of the signal VS6 and provides a signal R5 to the controller 30. For example, it is determined that the number of vertical lines of the signal VS6 is 625 when the signal R5 is at logic high level, and it is determined that the number of vertical lines of the signal VS6 is 525 when the signal R5 is at logic low level.

As described above, the controller 30 receives the signals R1~R5 output by the chroma detector 21, the chroma detector 22, the horizontal sync detector 40, and the vertical sync detector 50 and accordingly outputs signals S1~S4 to the chroma detector 21, the chroma detector 22, the horizontal sync detector 40, and the vertical sync detector 50. To speak more specifically, the controller 30 controls the operation states of the chroma detector 21, the chroma detector 22, the horizontal sync detector 40, and the vertical sync detector 50 by using the signals S1~S4. The chroma detector 21, the chroma detector 22, the horizontal sync detector 40, and the vertical sync detector 50 operate with different parameters according to different operation states thereof.

On the other hand, the Y/C separator 70 performs a Y/C separation process to the signal VS3 and provides a signal VS4 to the output device 80. The output device 80 receives the signals VS4 and VS7 and accordingly provides a signal VS8 to a back-end (not shown).

In the present embodiment, the chroma detector 21 and the chroma detector 22 have the same components. An implementation of the chroma detector will be described blow so that those skilled in the art can implement the chroma detector in the present invention accordingly.

Figure 2:
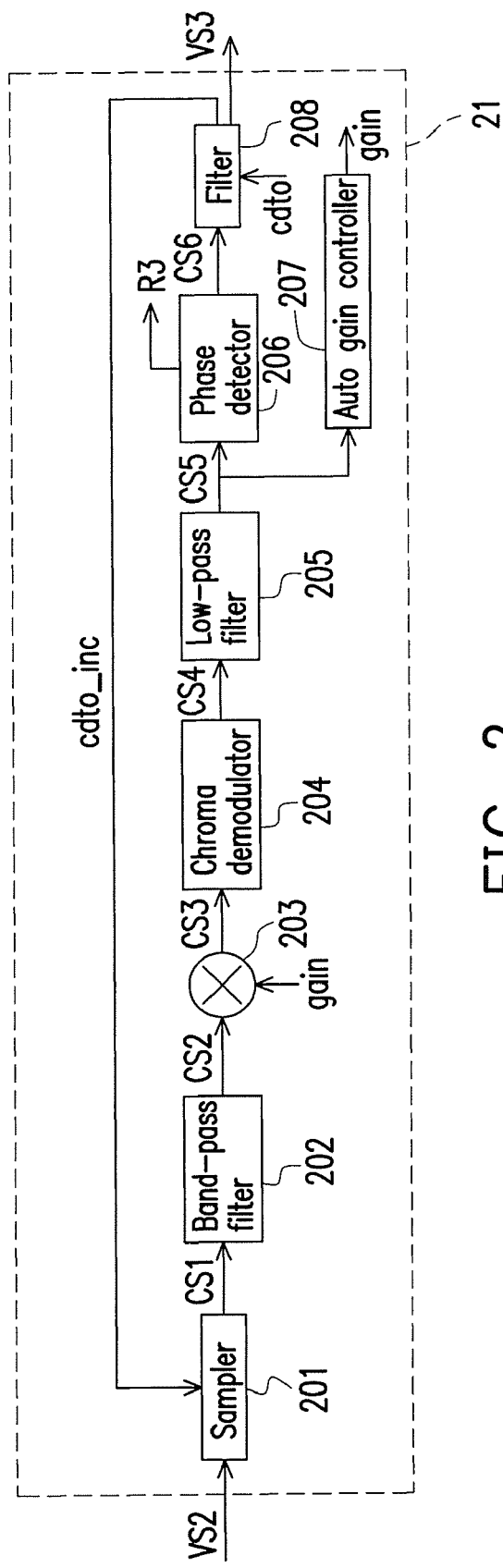
FIG. 2 is a block diagram of a chroma detector according to an embodiment of the present invention.

FIG. 2 is a block diagram of a chroma detector according to an embodiment of the present invention. Referring to both FIG. 1 and FIG. 2, only the chroma detector 21 will be described herein as an example since the chroma detector 21 and the chroma detector 22 have the same components. The chroma detector 21 includes a sampler 201, a band-pass filter 202, a multiplier 203, a chroma demodulator 204, a low-pass filter 205, a phase detector 206, an auto gain controller (AGC) 207, and a filter 208.

In the present embodiment, the sampler 201 is coupled to the band-pass filter 202 and the filter 208. The multiplier 203 is coupled to the band-pass filter 202, the chroma demodulator 204, and the AGC 207. The low-pass filter 205 is coupled to the chroma demodulator 204, the phase detector 206, and the AGC 207.

As described above, the sampler 201 samples the signal VS2 according to a parameter cdto_inc and accordingly generates a sample signal CS1. The band-pass filter 202 performs a band-pass filtering process to the sample signal CS1 to filter out the chroma information in the sample signal CS1 (it should be noted that the chroma information still contains some brightness information and accordingly, a complete Y/C separation process has to be carried out subsequently by the Y/C separator 70) and generates a signal CS2 to be used in subsequent chroma phase detection.

Next, the multiplier 203 performs a multiplication to the signal CS2 according to a gain and generates a signal CS3. This is because the amplitude of a color burst signal is usually very small, and accordingly an amplitude adjustment is performed by the multiplier 203 by using a gain in order to make subsequent processing of the color burst signal easier.

The chroma demodulator 204 and the low-pass filter 205 demodulate the signal. As well known in the industry, color information is usually modulated through sine/cosine functions. Thus, while demodulating the signal, the signal is first multiplied by a sine/cosine function to divide the signal into a low-frequency part and a double-frequency part. The chroma demodulator 204 performs foregoing operation and multiplies the signal CS3 by a sine/cosine signal to generate a signal CS4. Subsequently, the low-pass filter 205 performs a low-pass filtering process to the signal CS4 to filter out foregoing double-frequency signal and obtain a demodulated signal CS5. For example, a color signal is usually transmitted through a U/V signal, wherein the U/V signal is respectively modulated through a sine/cosine function. When the signal is demodulated, the U/V has to be separated through the method described above.

As described above, the AGC 207 generates the gain according to the amplitude of the color burst in the signal CS5 and sends the gain back to the multiplier 203 to carry out foregoing amplitude adjustment. The phase detector 206 detects whether the phase of the color burst in the signal CS5 can be correctly locked and accordingly provides the signal R3 to the controller 30. In addition, the phase detector 206 also detects a phase error CS6 and sends the phase error CS6 to the filter 208. The filter 208 performs an average calculation (i.e., a low-pass filtering process) to the phase error CS6 and obtains a compensated sample parameter cdto_inc according to an ideal sample parameter cdto_inc corresponding to the current state, and the filter 208 sends the compensated sample signal cdto_inc back to the sampler 201 so that the sampler 201 can samples the signal according to the compensated sample parameter cdto_inc. Besides, the filter 208 outputs the processed video signal so that the Y/C separator 70 can carry out a complete Y/C separation to the video signal.

It should be noted herein that in the present embodiment, the filtering parameter cdto is determined according to the operation state of the chroma detector 21. Namely, different operation state is corresponding to different ideal filtering parameter cdto. For example, the NTSC format and the PAL format have different filtering parameters.

Those skilled in the art should be able to implement the chroma detector 22 according to foregoing description with reference to FIG. 2. It should be mentioned herein that in embodiments of the present invention, the chroma detector 21 is used for processing the signal while the chroma detector 22 is used for detecting whether the phase of the signal can be locked correctly. Thus, the controller 30 determines whether to change the operation state according to the signal R4 generated by the phase detector 206 of the chroma detector 22 instead of the signal R3. The controller 30 changes the operation state by only referring to the signal R3 output by the chroma detector 21. In other words, in the present embodiment, the signal R3 is an optional signal.

Similarly, since in the present embodiment, the chroma detector 21 is used for performing the actual operation while the chroma detector 22 is used for detecting whether the phase of the signal can be correctly locked, the signal VS3 generated by the filter 208 in the chroma detector 22 is not really used in subsequent signal processing. In other words, the filter 208 of the chroma detector 22 may not be coupled to the Y/C separator 70. This will be further described below with reference to the accompanying drawings.

Figure 3:
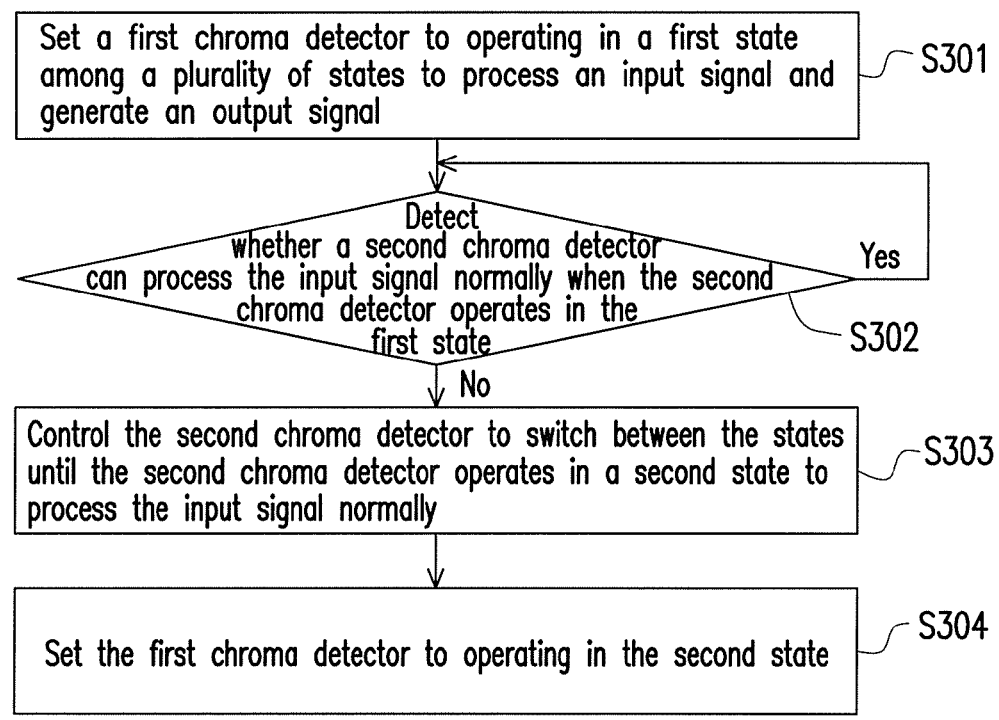
FIG. 3 is a flowchart of a state detection method according to an embodiment of the present invention.

FIG. 3 is a flowchart of a state detection method according to an embodiment of the present invention. Referring to both FIG. 1 and FIG. 3, first, in step S301, the controller 30 sets the chroma detector 21 to operating in a first state among a plurality of states through the signal S3. Accordingly, the chroma detector 21 processes the signal VS2 and generates the signal VS3. Then, in step S302, whether the chroma detector 22 can process the signal VS2 normally (as described above, the chroma detector 22 detects whether the phase of the signal can be correctly locked) when the chroma detector 22 operates in the first state is detected and the signal R4 is generated. Namely, in step S302, whether the chroma detector 22 can process the signal VS2 normally when it operates in the same state as the chroma detector 21 is detected.

Next, the controller 30 determines whether to execute step S303 according to the signal R4. When the chroma detector 22 cannot process the signal VS2 normally, the signal R4 is at logic low level, and step S303 is executed, wherein the controller 30 controls the chroma detector 22 to switch between foregoing states through the signal S4 until the chroma detector 22 operates in a second state to process the signal VS2 normally. It should be mentioned that in step S303, the controller 30 may not change the operation state of the chroma detector 21 so that the chroma detector 21 can maintain its original operation state to process the signal VS2 constantly and provide a signal VS3 to the Y/C separator 70. Accordingly, the quality of a displayed image is not affected in step S303.

Since the chroma detector 21 and the chroma detector 22 have similar components and the chroma detector 22 can process the signal VS2 normally when it operates in the second state, the chroma detector 21 can also process the signal VS2 normally when it operates in the second state. Thus, in step S304, the controller 30 switch the chroma detector 21 to the second state through the signal S3. Accordingly, the controller 30 only switches the state of the chroma detector 21 once to adjust the chroma detector 21 to the certain operation state. Thus, the interference to the displayed image caused by switching the operation state of the chroma detector 21 is reduced. Compared to the conventional technique, the method in the present embodiment can resolve the transient problem in the displayed image.

It should be mentioned that even though a possible model of the state detector and the state detection method thereof for a video device has been provided in the embodiment described above, it is understood by those having ordinary knowledge in the art that different manufacturers have different designs for the state detector and the state detection method thereof, and accordingly, the application of the present invention should not be limited to aforementioned model. In other words, it is within the scope of the present invention as long as the first chroma detector and the second chroma detector are operated in the same state and when it is detected that the second chroma detector cannot process the input signal normally, the second chroma detector is controlled to switch between foregoing states until the second chroma detector can normally operate in a certain operation state to process the input signal and then the first chroma detector is switched into the certain operation state. Embodiments of the present invention will be further described below so that those having ordinary knowledge in the art can understand and implement the present invention accordingly.

Referring to FIG. 1 again, in the embodiment described above, the chroma detector 21 and the chroma detector 22 have the same components; however, the present invention is not limited thereto.

Figure 4:
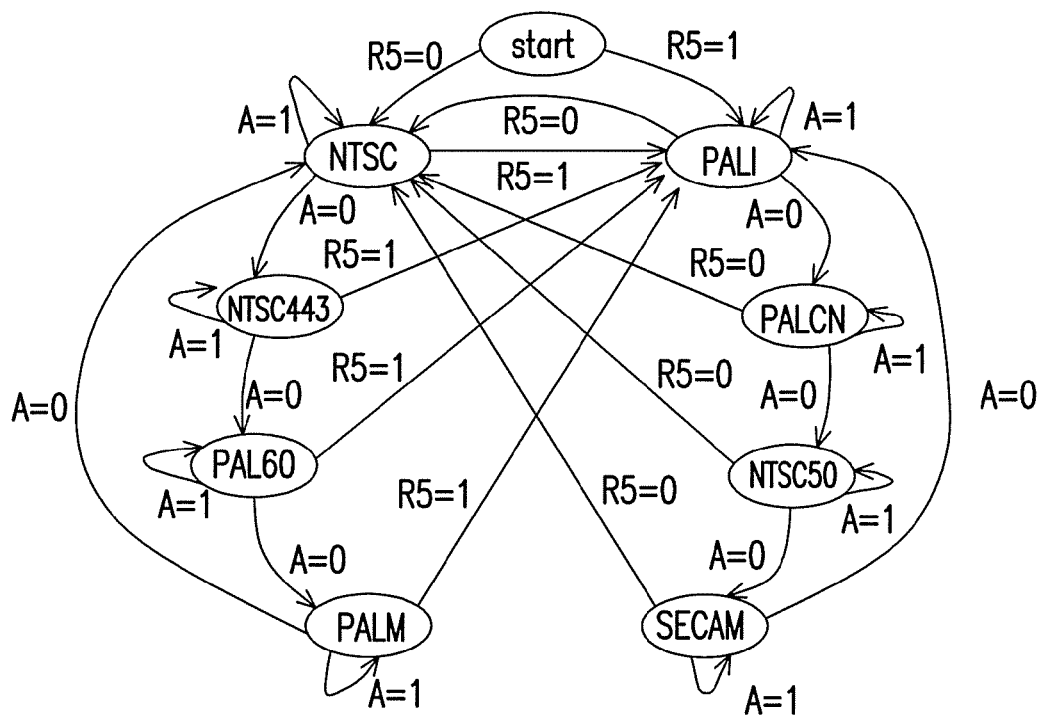
FIG. 4 is a diagram of a finite state machine (FSM) according to an embodiment of the present invention.

Referring to FIG. 1 again, in the embodiment described above, the controller 30 determines whether to switch the operation state of the chroma detector 22 according to only the signal R4; however, the present invention is not limited thereto. In another embodiment of the present invention, the controller 30 further controls the operation states of various components according to the feedback signals of these components. FIG. 4 is a diagram of a FSM according to an embodiment of the present invention. Referring to FIG. 1 and FIG. 4, in the present embodiment, the FSM has 9 states, which are respectively start, NTSC, NTSC443, PAL60, PALM, PALI, PALCN, NTSC50, and SECAM. It should be mentioned that foregoing states respectively have their corresponding signals S1~S4. To be more specific, the controller 30 provides signals S1~S4 corresponding to different state to the chroma detector 21, the chroma detector 22, the horizontal sync detector 40, and the vertical sync detector 50. The method for switching between different states will be described in detail below.

In the state start: When the controller 30 receives the signal R5 at logic high level (1), it switches the chroma detector 22 to the state PALI. When the controller 30 receives the signal R5 at logic low level (0), it switches the chroma detector 22 to the state NTSC.

In the state NTSC: When the controller 30 receives the signal R5=1, it switches the chroma detector 22 to the state PALI. When the controller 30 receives the signal A=0, it switches the chroma detector 22 to the state NTSC33. When the controller 30 receives the signal A=1, the chroma detector 22 remains in its original state (NTSC). In the present embodiment, A=R1&R2&R4. To be more specific, A is at logic high level (1) only when the signals R1, R2 and R4 are all at logic high level (1).

In the state NTSC443: When the controller 30 receives the signal R5=1, it switches the chroma detector 22 to the state PALI. When the controller 30 receives the signal A=0, it switches the chroma detector 22 to the state PAL60. When the controller 30 receives the signal A=1, the chroma detector 22 remains in its original state (NTSC443).

In the state PAL60: When the controller 30 receives the signal R5=1, it switches the chroma detector 22 to the state PALI. When the controller 30 receives the signal A=0, it switches the chroma detector 22 to the state PALM. When the controller 30 receives the signal A=1, the chroma detector 22 remains in its original state (PAL60).

In the state PALM: When the controller 30 receives the signal R5=1, it switches the chroma detector 22 to the state PALI. When the controller 30 receives the signal A=0, it switches the chroma detector 22 to the state NTSC. When the controller 30 receives the signal A=1, the chroma detector 22 remains in its original state (PALM).

In the state PALI: When the controller 30 receives the signal R5=0, it switches the chroma detector 22 to the state NTSC. When the controller 30 receives the signal A=0, it switches the chroma detector 22 to the state PLACN. When the controller 30 receives the signal A=1, the chroma detector 22 remains in its original state (PALI).

In the state PLACN: When the controller 30 receives the signal R5=0, it switches the chroma detector 22 to the state NTSC. When the controller 30 receives the signal A=0, it switches the chroma detector 22 to the state NTSC50. When the controller 30 receives the signal A=1, the chroma detector 22 remains in its original state (PLACN).

In the state NTSC50: When the controller 30 receives the signal R5=0, it switches the chroma detector 22 to the state NTSC. When the controller 30 receives the signal A=0, it switches the chroma detector 22 to the state SECAM. When the controller 30 receives the signal A=1, the chroma detector 22 remains in its original state (NTSC50).

In the state SECAM: When the controller 30 receives the signal R5=0, it switches the chroma detector 22 to the state NTSC. When the controller 30 receives the signal A=0, it switches the chroma detector 22 to the state PALI. When the controller 30 receives the signal A=1, the chroma detector 22 remains in its original state (SECAM).

Figure 5:
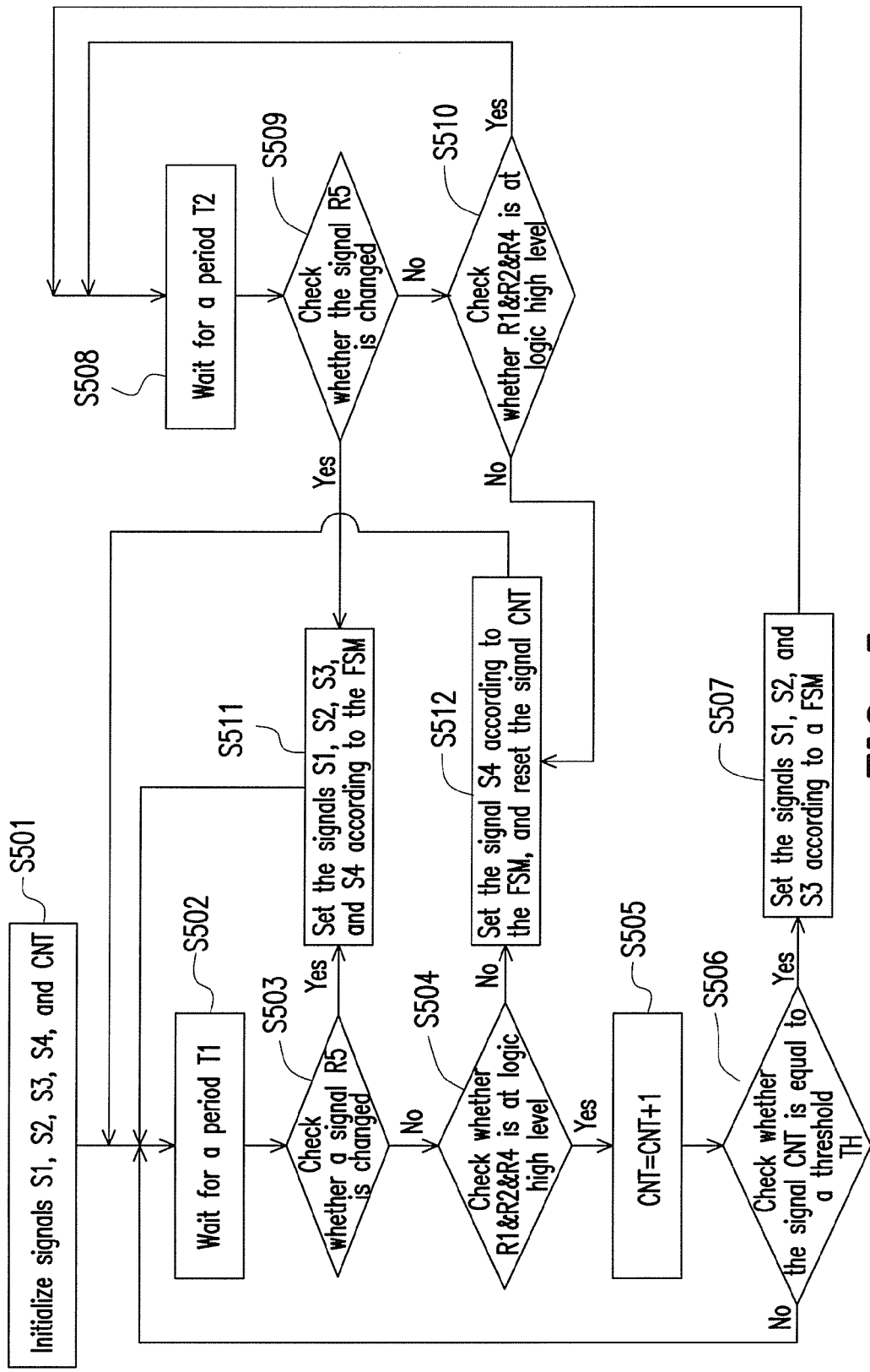
FIG. 5 is a flowchart of a state detection method according to an embodiment of the present invention.

FIG. 5 is a flowchart of a state detection method according to an embodiment of the present invention. Referring to FIG. 1, FIG. 4, and FIG. 5, first, in step S501, the controller 30 initializes the signals S1, S2, S3, S4, and CNT, wherein CNT is a count value. Then, in step S502, a period T1 of a timer (not shown) is waited for, wherein the period T1 may be 20 ms. Next, in step S503, the controller 30 checks whether the signal R5 is changed. For example, it is determined that the signal R5 is changed when the signal R5 is changed from 0 to 1 or from 1 to 0 and step S511 is then executed. In step S511, the controller 30 sets the signals S1~S4 correspondingly according to the FSM in FIG. 4.

On the other hand, step S504 is executed when the signal R5 is not changed, wherein the controller 30 checks whether the signal A is 1 (whether R1&R2&R4 is at logic high level). If the signal A is 1, step S505 is executed; otherwise, step S512 is executed. In step S512, the controller 30 sets the signal S4 correspondingly and resets CNT according to the FSM in FIG. 4. It should be mentioned that in step S512, only the mode of the chroma detector 22 but not the chroma detector 21 is changed. Thus, the chroma detector 21 can still process the signal VS2 constantly without affecting the displayed image.

Additionally, in step S505, the controller 30 increases CNT by 1. Next, in step S506, the controller 30 checks whether CNT is equal to a threshold TH. If CNT is equal to the threshold TH, step S507 is executed; otherwise, step S502 is executed. It should be mentioned herein that the value of the threshold TH can be determined according to the actual requirement by those skilled in the art, and the greater the threshold TH is, the step S507 is executed in a state of higher stability; contrarily, the smaller the threshold TH is, the step S507 is executed in a state of lower stability. From another point of view, the step S506 is executed to determine whether the current state is stable.

In step S507, the controller 30 sets the signals S1~S3 according to the FSM in FIG. 4. Then, in step S508, a period T2 of the timer is waited for before step S509 is executed, wherein the period T2 may also be 20 ms. In step S509, the controller 30 checks whether the signal R5 is changed. If the signal R5 is changed, step S511 is executed; otherwise, step S510 is executed. In step S510, the controller 30 checks whether the signal A is 1. If the signal A is 1, step S508 is executed; otherwise, step S512 is executed. Accordingly, the same function can be achieved as in the embodiment described above.

It should be noted that the FSM in FIG. 4 and the steps in FIG. 5 are only an embodiment of the present invention and the present invention is not limited thereto. The FSM in FIG. 4 and the steps in FIG. 5 can be changed according to the actual requirement by those skilled in the art.

In overview, according to the present invention, a first chroma detector and a second chroma detector are operated in the same state. When it is detected that the second chroma detector cannot process the input signal normally, the second chroma detector is controlled to switch between a plurality of states until the second chroma detector can normally operate in a certain operation state to process the input signal correctly, and the first chroma detector is switched into that certain operation state as well. Thereby, the transient problem in a displayed image can be resolved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A state detector of a video device, comprising:
   a first chroma detector, operating in a first state among a plurality of states, for processing an input signal and generating an output signal;
   a second chroma detector, operating in the first state among the states, for detecting whether the input signal is processed normally; and
   a controller, coupled to the first chroma detector and the second chroma detector, wherein when the second aroma detector is not capable of processing the input signal normally, the controller controls the second chroma detector to switch between the states until the second chroma detector operates in a second state to process the input signal normally, and the controller sets the first chroma detector to operating in the second state,
   wherein the second chroma detector comprises a phase detector, the phase detector is configured to detect whether a phase of the input signal can be locked to output a first signal, and the controller determines whether the second chroma detector is capable of processing the input signal normally according to the first signal.

2. The state detector according to claim 1, wherein the first chroma detector and the second chroma detector have same functions and operations.

3. The state detector according to claim 1, wherein the first chroma detector comprises:
   a sampler, for sampling the input signal according to a first parameter;
   a band-pass filter, coupled to the sampler, for performing a band-pass filtering process to the input signal;
   a multiplier, coupled to the band-pass filter, for performing a multiplication to the input signal according to a gain;
   a chroma demodulator, coupled to the multiplier, for performing a chroma demodulation process to the input signal;
   a low-pass filter, coupled to the chroma demodulator, for performing a low-pass filtering process to the input signal;
   an auto gain controller (AGC), coupled to the low-pass filter, for generating the gain according to the input signal; and
   a filter, coupled to the low-pass filter and the sampler, for filtering the input signal according to a second parameter and generating the first parameter.

4. The state detector according to claim 1, wherein the second chroma detector comprises:
- a sampler, for sampling the input signal according to a first parameter;
- a band-pass filter, coupled to the sampler, for performing a band-pass filtering process to the input signal;
- a multiplier, coupled to the band-pass filter, for performing a multiplication to the input signal according to a gain;
- a chroma demodulator, coupled to the multiplier, for performing a chroma demodulation process to the input signal;
- a low-pass filter, coupled to the chroma demodulator, for performing a low-pass filtering process to the input signal, wherein the phase detector is coupled to the low-pass filter;
- an AGC, coupled to the low-pass filter, for generating the gain according to the input signal;
- a filter, coupled to the phase detector and the sampler, for filtering the input signal according to a second parameter and generating the first parameter.

5. The state detector according to claim 1 further comprising:
- a clamp and gain control circuit, coupled to the first chroma detector and the second chroma detector, for adjusting an offset and a gain of the input signal and outputting the adjusted input signal to the first chroma detector and the second chroma detector.

6. The state detector according to claim 1 further comprising:
- a horizontal sync detector, coupled to the controller, wherein an operation state of the horizontal sync detector is determined according to a control signal output by the controller, and the horizontal sync detector horizontally synchronizes the input signal and detects whether the input signal is horizontally synchronized.

7. The state detector according to claim 1 further comprising:
- a vertical sync detector, coupled to the controller, wherein an operation state of the vertical sync detector is determined according to a control signal output by the controller, and the vertical sync detector vertically synchronizes the input signal and detects whether the input signal is vertically synchronized.

8. The state detector according to claim 1 further comprising:
- a Y/C separator, coupled to the first chroma detector, for performing a Y/C separation process to the output signal and accordingly generating a processed signal.

9. The state detector according to claim 8 further comprising:
- an output device, coupled to the Y/C separator, for outputting the processed signal.

10. A state detection method for a video device, wherein the video device comprises a first chroma detector and a second chroma detector, the state detection method comprising:
- setting the first chroma detector to operating in a first state among a plurality of states to process an input signal and generate an output signal;
- detecting whether the second chroma detector can process the input signal normally when the second chroma detector operates in the first state among the states, wherein the second chroma detector comprises a phase detector, the phase detector is configured to detect whether a phase of the input signal can be locked to output a first signal, and the step of detecting whether the second chroma detector can process the input signal normally is according to the first signal;
- when the second chroma detector cannot process the input signal normally, controlling the second chroma detector to switch between the states until the second chroma detector operates in a second state to process the input signal normally; and
- setting the first chroma detector to operating in the second state.

11. A state detection method for a video device, wherein the video device comprises a first chroma detector and a second chroma detector, and the first chroma detector operates in a first state to process an input signal and accordingly generate an output signal, the state detection method comprising:
- detecting whether the second chroma detector processes the input signal normally when the second chroma detector operates in the first state, wherein the second chroma detector comprises a phase detector, the phase detector is configured to detect whether a phase of the input signal can be locked to output a first signal, and the step of detecting whether the second chroma detector processes the input signal normally is according to the first signal;
- when the second chroma detector is not capable of processing the input signal normally, keeping the first chroma detector to operation in the first state and controlling the second chroma detector to switch between a plurality of states until the second chroma detector operates in a second state to process the input signal normally; and
- switching the first chroma detector from the first state to the second state to process the input signal.

* * * * *